US012798760B2

(12) United States Patent
Roda et al.

(10) Patent No.: US 12,798,760 B2
(45) Date of Patent: Nov. 17, 2026

(54) REVERSIBLE HYDRAULIC PUMP FOR SETTING PROPELLOR PITCH, AND ASSOCIATED HYDRAULIC SYSTEM, TURBOPROP AND AIRCRAFT

(71) Applicant: SAFRAN AIRCRAFT ENGINES, Paris (FR)

(72) Inventors: Jean Charles Olivier Roda, Moissy Cramayel (FR); Blaise Bergon, Moissy Cramayel (FR); Huguette de Wergifosse, Moissy Cramayel (FR); Caroline Frantz, Moissy Cramayel (FR); Vincent Francois Georges Millier, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 66 days.

(21) Appl. No.: 18/709,074

(22) PCT Filed: Nov. 8, 2022

(86) PCT No.: PCT/EP2022/081138
§ 371 (c)(1),
(2) Date: May 10, 2024

(87) PCT Pub. No.: WO2023/083813
PCT Pub. Date: May 19, 2023

(65) Prior Publication Data

US 2025/0042536 A1 Feb. 6, 2025

(30) Foreign Application Priority Data

Nov. 12, 2021 (FR) ...................................... 2112000

(51) Int. Cl.
*B64C 11/38* (2006.01)
*F15B 15/18* (2006.01)

(52) U.S. Cl.
CPC .............. *B64C 11/38* (2013.01); *F15B 15/18* (2013.01)

(58) Field of Classification Search
CPC ....... B64C 11/30; B64C 11/38; B64C 11/385; F01D 7/00; F01D 7/02; F05D 2270/64
See application file for complete search history.

(56) References Cited

U.S. PATENT DOCUMENTS

2021/0128487 A1* 5/2021 Yang .................... A61K 9/5115
2021/0317800 A1* 10/2021 Yesilcimen ............... F02K 3/00

FOREIGN PATENT DOCUMENTS

DE 102012218517 A1 * 4/2014 ............ B60K 17/10
EP 2674622 A2 12/2013

(Continued)

OTHER PUBLICATIONS

International Patent Application No. PCT/EP2022/081138, International Search Report and Written Opinion dated Feb. 10, 2023, 13 pages (11 pages of original document and 2 pages of English translation).

*Primary Examiner* — Nathaniel E Wiehe
*Assistant Examiner* — Maxime M Adjagbe
(74) *Attorney, Agent, or Firm* — Kilpatrick Townsend & Stockton LLP

(57) ABSTRACT

A reversible hydraulic pump for setting the pitch of a propellor of a turboprop can include two barrels connected by a transmission shaft. The first and second barrels are connected to the transmission shaft via first and second clutch means so that, when the transmission shaft rotates in a first direction, only the first barrel is rotated by the transmission shaft, and so that, when the transmission shaft rotates in a second direction opposite to the first direction, only the second barrel is rotated by the transmission shaft.

18 Claims, 4 Drawing Sheets

(56) References Cited

FOREIGN PATENT DOCUMENTS

| | | | |
|---|---|---|---|
| FR | 2167697 | A6 | 8/1973 |
| FR | 2978953 | A1 | 2/2013 |

* cited by examiner

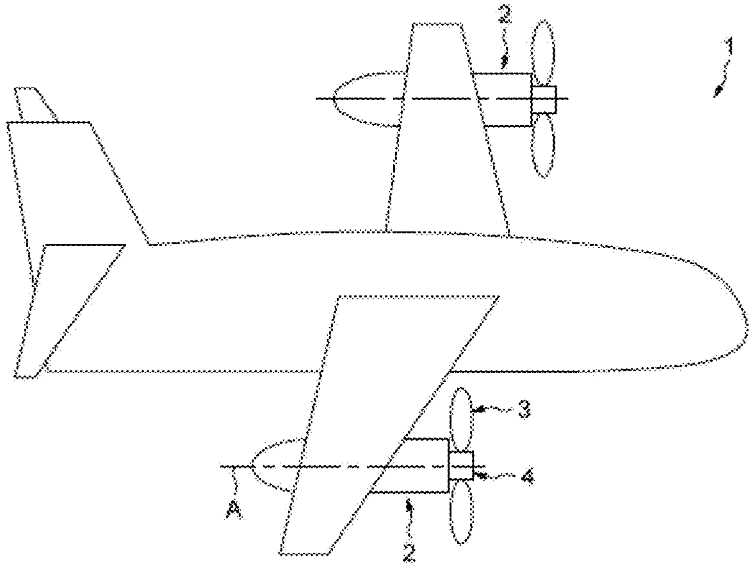
[Fig 1]

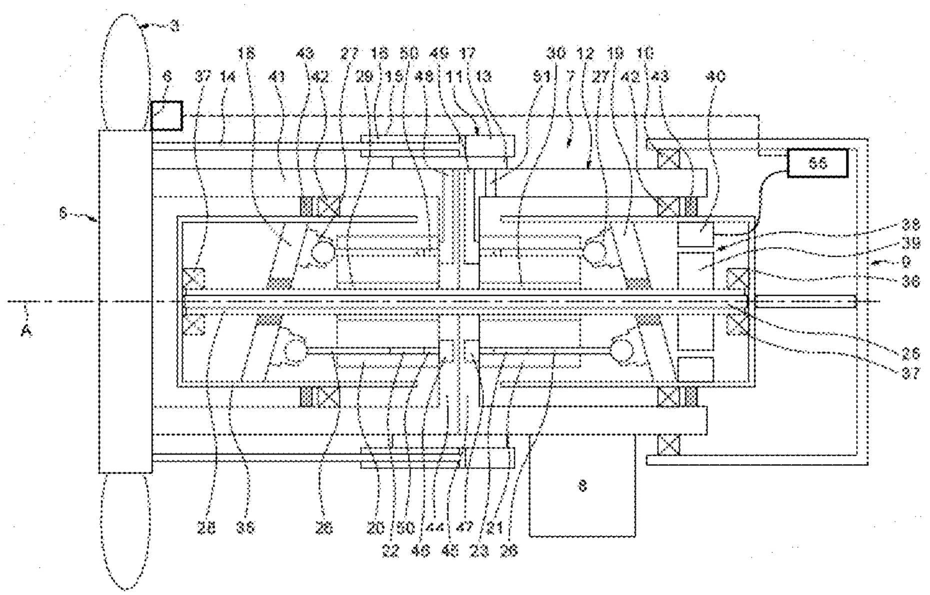
[Fig 2]

[Fig 3]
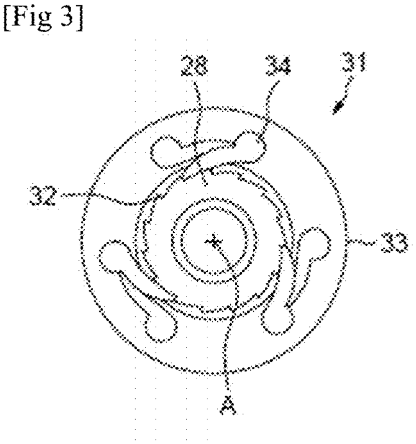
[Fig 4]
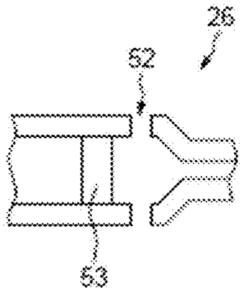
[Fig 5]
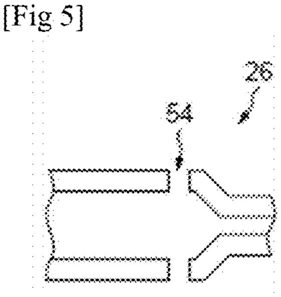

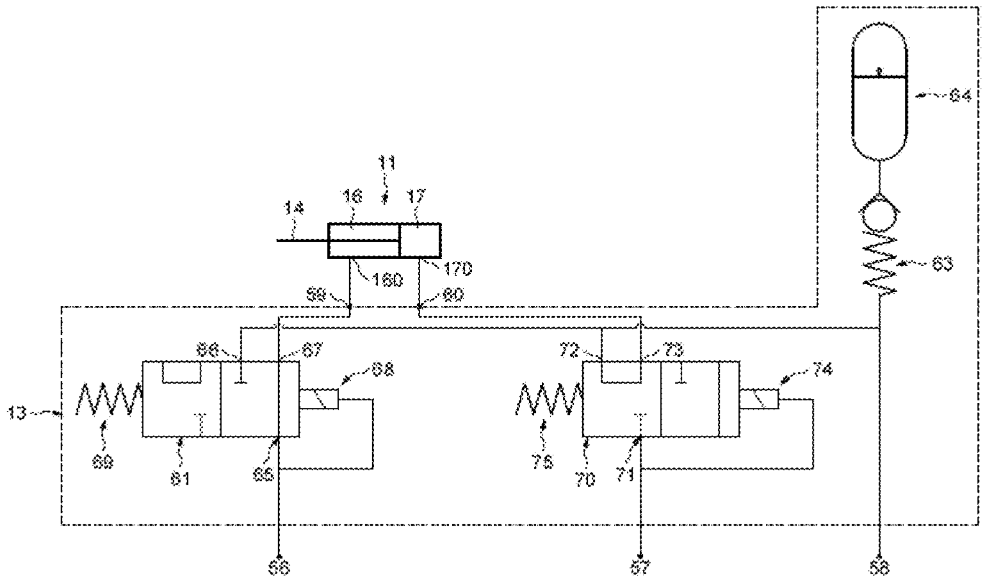
[Fig 6]

REVERSIBLE HYDRAULIC PUMP FOR SETTING PROPELLOR PITCH, AND ASSOCIATED HYDRAULIC SYSTEM, TURBOPROP AND AIRCRAFT

TECHNICAL FIELD OF THE INVENTION

The invention relates to systems for hydraulically actuating the pitch of a propeller equipping turboprops, and more particularly pumps delivering a hydraulic pressure to activate such systems.

The invention further relates to a hydraulic system for setting the pitch of a propeller equipped with such a pump, a turboprop equipped with such a hydraulic system and an aircraft comprising such a turboprop.

PRIOR ART

In general, an aircraft equipped with turboprops, "turbofans" in English, comprises systems for hydraulically actuating the propeller pitch equipping the turboprops. The actuation of the pitch of a propeller is obtained thanks to a propeller pitch setting device actuated by a hydraulic cylinder.

The hydraulic cylinder and the pitch setting device rotate with the propeller.

In general, a hydraulic pump is implemented in the fixed portion of the turboprop and supplies the cylinder with pressurised oil via a rotary joint.

However, oil escapes from the rotary joint so that it is necessary to recover the oil that has leaked from the rotary joint.

The recovery of the oil requires adding, in the turboprop, a recovery system comprising oil recovery pumps and a reservoir.

The implantation of such a system requires providing for a space in the turboprop and increases the mass of the turboprop.

It is known to connect the hydraulic cylinder directly to the pump and drive the hydraulic pump by an electric motor, the hydraulic pump and the electric motor being arranged in a rotating reference frame connected to the propeller.

The supply of the electric motor requires the implementation of a rotating electrical transformer.

However, the rotor of the electric machine should be permanently driven at the speed of the propeller to prevent any pitch setting variation, resulting in an electric power consumption and in a thermal oversizing of the electric machine.

Furthermore, the implantation of the rotating electrical transformer increases the mass of the turboprop.

It is also known to arrange a non-reversible hydraulic pump in a rotating reference system connected to the propeller and to arrange an electric motor in the fixed portion of the turboprop to drive the hydraulic pump.

Since the hydraulic pump is not reversible, it is necessary to add a hydraulic valve controlled between the pump and the cylinder to retract and extend the piston of the cylinder.

However, the addition of a hydraulic valve requires providing for a space in the turbocompressor positioned in the rotating reference system and adding means for controlling the valve arranged in the fixed portion.

Furthermore, a propeller pitch setting system is known comprising an axial piston hydraulic pump supplying a cylinder arranged in a rotating reference system connected to the propeller of a turboprop.

The system includes valves configured so that, in the absence of rotation of a shaft of the pump, the pump does not deliver hydraulic fluid despite driving of the body of the pump at the speed of the propeller. The pump is driven by an electric motor.

However, the system does not allow achieving a upon of the flow of the pump upon reversal of the direction of rotation of the electric motor.

The document EP 2 674 622 discloses a reversible hydraulic pump outputting a flow in both directions of rotation of a shaft of the pump.

The pump includes two axial-piston pumps comprising offset intake ports so that an axial-piston pump outputs hydraulic fluid when the pump rotates in one direction, and so that the other axial-piston pump outputs hydraulic fluid when the pump rotates in the other direction.

However, since the two axial-piston pumps are driven independently of the direction of rotation of the shaft of the reversible hydraulic pump, the axial-piston pump which does not output hydraulic fluid cavitates resulting in degradation thereof.

The invention aims to overcome all or part of these drawbacks.

DISCLOSURE OF THE INVENTION

In view of the foregoing, an object of the invention is a reversible hydraulic pump for setting the pitch of a propeller of a turboprop comprising two barrels connected by a transmission shaft.

The first and second barrels are connected to the transmission shaft via first and second clutch means so that, when the transmission shaft rotates in a first direction, only the first barrel is driven in rotation by the transmission shaft, and so that, when the transmission shaft rotates in a second direction opposite to the first direction, only the second barrel is driven in rotation by the transmission shaft.

The clutch means allow driving only one of the barrels according to the direction of rotation of the transmission shaft so that the other barrel is not driven thereby preventing it from being subjected to cavitation phenomena.

Preferably, the first clutch means comprise a first flywheel connecting the first barrel to the transmission shaft when the transmission shaft rotates in the first direction and uncouples the first barrel from the transmission shaft when the transmission shaft rotates in the second direction, and the second clutch means comprise a second flywheel connecting the second barrel to the transmission shaft when the transmission shaft rotates in the second direction and uncouples the second barrel from the transmission shaft when the transmission shaft rotates in the first direction.

The clutch means made from flywheels are simple to make.

Advantageously, the pump further comprises two symmetrical and opposite angled plates, and two casings, the first casing accommodating the first plate and the first cylinder, and the second casing accommodating the second plate and the second cylinder, the first and second plates and the first and second casings being fixed with respect to the transmission shaft, central axes of the plates and of the barrels being coaxial.

Preferably, the second casing further comprises an electric motor for driving the transmission shaft, the motor including a rotor formed on the transmission shaft and a stator secured to the second casing.

Advantageously, each barrel comprises bores and hollow cylinders sliding in the bores when said barrel is rotating, each hollow cylinder including a radial bore and a suction valve so that a hydraulic fluid flows into at least one hollow cylinder via the bore and the suction valve during a phase for sucking the fluid into said cylinder by the hollow cylinder.

Preferably, each barrel comprises bores and hollow cylinders sliding in the bores when said barrel is rotating, each hollow cylinder including a radial bore, the stroke of the hollow cylinder in the bore associated with the hollow cylinder and the position of the radial bore in the hollow cylinder being selected so that a hydraulic fluid flows into at least one hollow cylinder via the bore during a phase of sucking the fluid into said barrel by the hollow cylinder, and so that the bore of said cylinder is covered by the bore associated with said hollow cylinder during a phase of compressing the fluid in said barrel and a phase of discharging the fluid out of said barrel by the hollow cylinder.

Advantageously, the pump comprises sliding pads, the hollow cylinders of the first barrel bearing on the first plate via sliding pads, and the hollow cylinders of the second barrel bearing on the second plate via the sliding pads, the pump further comprising a third cylindrical card accommodating the first and second casings, and intended to contain the hydraulic fluid sucked in during the suction phase, a central axis of the third casing and a central axis of each plate being coaxial, the third casing rotating around the first and second casings and including two port plates each located at the end of a different barrel opposite to the end of said barrel opposite a plate, each cylindrical port plate comprising a concentric groove connected to an outlet different from the casing, each end of the hollow cylinder opposite to the end of said hollow cylinder in contact with a sliding pad comprising a discharge valve so that, during the discharge phase, pressurised hydraulic fluid compressed by the hollow cylinders of one of the first and second barrels escapes from the casing via one of the outlets of the casing connected to said barrel, the third casing further comprising an inlet intended to supply the casing with hydraulic fluid.

A hydraulic system for setting the pitch of a propeller of a turboprop comprising a reversible hydraulic pump as defined before is also proposed, a double-acting hydraulic cylinder including two inlets each connected to a different chamber of the cylinder and configured to drive a propeller pitch setting mechanical device, each inlet of the cylinder being connected to a different outlet of the third casing via hydraulic fluid regulation means, and the inlet of the third casing being connected to the inlets of the cylinder via the regulation means, the regulation means being configured to connect a first outlet of the third casing to a first inlet of the cylinder and to connect the second inlet of the cylinder to the inlet of the third casing when pressurised hydraulic fluid flows through the first outlet, and being configured to connect the second outlet of the third casing to the second inlet of the cylinder and to connect the first inlet of the cylinder to the inlet of the third casing when pressurised hydraulic fluid flows through the second outlet.

The regulation means are controlled by the pressure of the hydraulic fluid output by the pump so that they operate in a standalone manner without any interaction with a control device of the turboprop.

A turboprop is also proposed comprising a propulsion propeller connected to a propeller pitch setting mechanical device and a hydraulic system as defined before, the cylinder being connected to the propeller pitch setting mechanical device.

Advantageously, the turboprop further comprises control means configured to control the electric motor according to a setpoint value and the pitch angle of the propeller.

An aircraft including a turboprop as defined before is also proposed.

BRIEF DESCRIPTION OF THE DRAWINGS

Other aims, features and advantages of the invention will appear upon reading the following description, given just as a non-limiting example, and made with reference to the appended drawings wherein:

FIG. 1 schematically illustrates an aircraft according to the invention;

FIG. 2 schematically illustrates a partial section of a turboprop according to the invention;

FIG. 3 schematically illustrates an example of a flywheel according to the invention;

FIG. 4 schematically illustrates an example of a hollow cylinder according to the invention;

FIG. 5 schematically illustrates another example of a hollow cylinder according to the invention, and FIG. 6 schematically illustrates an example of regulation means according to the invention.

DETAILED DISCLOSURE OF AT LEAST ONE EMBODIMENT

Reference is made to FIG. 1 which schematically illustrates an example of an aircraft 1 including turboprops 2.

Each turboprop 2 includes a propeller 3 rotating about an axis A of the turboprop 2 and a hydraulic system 4 for setting the pitch of the propeller 3.

FIG. 2 schematically illustrates a partial section of the turboprop 2 including the hydraulic system 4.

The turboprop 2 comprises a pitch setting mechanical device 5 connected to the propeller 3 making the pitch of the propeller 3 vary, a sensor 6 for sensing the angle of the pitch of the propeller 3, a propulsion shaft 7 connected to the mechanical device 5 and driving the propeller, and propulsion means 8 driving the propulsion shaft 7.

For example, the propulsion means 8 include first gear wheels cooperating with second gear wheels of the propulsion shaft 7 forming a gearbox, and a turbine, the first gear wheels being driven by the turbine.

The turboprop further includes a fixed portion 9 with respect to the propulsion shaft 7.

Bearings 10 link the propulsion shaft 7 to the fixed portion 9.

The hydraulic system 4 comprises a double-acting hydraulic cylinder 11 actuating the mechanical device 5 to vary the pitch of the propeller 3, a reversible hydraulic pump 12 and regulation means 13.

The cylinder 11 is powered by the pump 12 via the regulation means 13.

The cylinder 11 comprises a piston 14 connected to the mechanical device 5 and a cylinder 15 accommodating the piston 14.

The piston 14 and the cylinder 15 define two chambers 16, 17, a first chamber 16 including a first inlet 160 (not shown) connected to the regulation means 13, and the second chamber 17 including a second inlet 170 (not shown) connected to the regulation means 13.

For example, the piston 14 is annular and surrounds the pump 12 so that the hydraulic system 4 is more compact thereby requiring less space for the implantation of said system in the propulsion shaft 7.

The reversible hydraulic pump 12 comprises two symmetrical and opposite angled plates 18, 19, and two barrels 20, 21 comprising bores 22, 23.

The two plates 18, 19 are connected together by a rod 25.

The pump 12 further comprises hollow cylinders 26 sliding in the bores 22, 23 of the barrels 20, 21.

The hollow cylinders 26 of a first barrel 20 bear on a first plate 18 via sliding pads 27, and the hollow cylinders 26 of the second barrel 21 bearing on the second plate 19 via the sliding pads 27.

The barrels 20, 21 are connected by a transmission shaft 28.

For example, the transmission shaft 28 comprises a central recess into which the rod 25 is inserted.

The transmission shaft 28, a central axis of the plates 18, 19, and the axis A are coaxial.

The first 20 and second 21 barrels are connected to the transmission shaft 28 via first 29 and second 30 clutch means.

When the transmission shaft 28 rotates in a first direction of rotation, the first clutch means 29 are engaged so that the transmission shaft 28 drives the first barrel 20, and the second clutch means 30 are disengaged so that the transmission shaft 28 does not drive the second barrel 21.

When the transmission shaft 28 rotates in the second direction of rotation opposite to the first direction of rotation, the first clutch means 29 are disengaged so that the transmission shaft 28 does not drive the first barrel 20, and the second clutch means 30 are engaged so that the transmission shaft 28 drives the second barrel 21.

When a barrel 20, 21 is rotating, the hollow cylinders 26 of said barrel translate in the bores of said barrel so as to suck in a hydraulic fluid into said barrel during a suction phase, compress the fluid in the barrel during a compression phase and discharge the compressed fluid outside the barrel during a discharge phase.

For example, the first clutch means 29 comprise a first flywheel connecting the first barrel 20 to the transmission shaft 28 when the transmission shaft rotates in the first direction and decoupling the first barrel 20 from the transmission shaft 28 when the transmission shaft rotates in the second direction.

For example, the second clutch means 30 comprise a second flywheel connecting the second barrel 21 to the transmission shaft 28 when the transmission shaft rotates in the second direction and decoupling the first barrel from the transmission shaft when the transmission shaft rotates in the first direction.

Since the first and second flywheels have an identical structure, only the first flywheel is detailed.

FIG. 3 illustrates an example of the first flywheel 31.

The first flywheel 31 comprises notches 32 formed on the transmission shaft 28, a ring 33 inserted at the centre of the first barrel 20 and pawls 34 cooperating with the notches 32.

During the rotation of the transmission shaft 28 in the first direction, the pawls 34 are engaged in the notches 32 so that the transmission shaft 28 drives the ring 33, and so that during the rotation of the transmission shaft 28 in the second direction, the pawls 34 are no longer engaged in the notches 32.

Referring to FIG. 2, the pump 12 further comprises a first casing 35 accommodating the first plate 18, the first barrel 20, and the hollow cylinders 26 and the associated sliding pads 27.

The pump 12 comprises a second casing 36 accommodating the second plate 19, the second barrel 21, and the hollow cylinders 26 and associated sliding pads 27.

The rod 25 further connects the first and second casings 35, 36 to one another.

The second casing 36 is fastened to the fixed portion 9 so that the first and second plates 19, 20, and the first and second casings 35, 36 are fixed with respect to the transmission shaft 26.

The first and second casings 35, 36 comprise bearings 37 supporting the transmission shaft 28.

The second casing 36 further comprises an electric motor 38 driving the transmission shaft 28.

The motor 38 includes a rotor 39 formed on the transmission shaft 28 and a stator 40 secured to the second casing 36.

The pump 12 further comprises a third casing 41 accommodating the first and second casings 35, 36 comprising the plates 18, 19, the first and second barrels 20, 21, and the hollow cylinders 26.

The propulsion shaft 7 (“rotor fan”) is formed by the third casing 41 of the pump 12.

The sealed third casing 41 contains the hydraulic fluid sucked in during the suction phase.

The first and second casings 35, 36 are sized so that the hydraulic fluid flows towards the barrels 20, 21.

A central axis of the third casing 41 and a central axis of each plate 18, 19 are coaxial.

The third casing 41 is secured to the device 5 so that it rotates at the speed of the propeller 3, and is connected to the first and second casings 35, 36 by bearings 42 and seals 43 to prevent the hydraulic fluid from escaping from the pump 12.

The rotational speed of the third casing 41 is decorrelated from the rotational speed of the transmission shaft 28.

The third casing 41 comprises two cylindrical port plates 44, 45 each located at the end of a different cylinder 20, 21 and opposite to the end of said barrel opposite a plate 18, 19.

Each port plate 44, 45 comprises a concentric groove 46, 47 connected to an outlet 48, 49 different from the third casing 41.

The first barrel 20 is connected to the first outlet 48 of the third casing 41 and the second barrel is connected to the second outlet 49 of the third casing 41.

The outlets 48, 49 of the third casing 41 are connected to the regulation means 13.

For example, the pump 12 delivers the hydraulic fluid at a pressure up to 350 bars allowing reducing the volume of the cylinder 11 for a predetermined force output by the cylinder 11 with regards to lower supply hydraulic fluid pressures, requiring a cylinder with a larger size to output said predetermined force.

For example, the hydraulic fluid comprises oil.

Each end of the hollow cylinder 26 of the two barrels 20, 21 opposite to the end of said hollow cylinder in contact with a sliding pad 27 comprises a discharge valve 50 so that, during the discharge phase, pressurised hydraulic fluid compressed by the hollow cylinders 26 of one of the first 20 and second 21 barrels escapes from the third casing 41 through one of the outlets 48, 49 of the third casing 41 connected to said barrel, and so that fluid does not flow into the grooves 46, 47 during the suction and compression phases.

The third casing 41 further comprises an inlet 51 connected to the regulation means 13.

Each plate 18, 19 includes a supply lunule so that the hydraulic fluid flows into the hollow cylinders 26 during the phase of sucking in the hydraulic fluid by the hollow cylinders and the bores associated with said hollow cylinders.

FIG. 4 illustrates a second embodiment of the hollow cylinder 26.

The hollow cylinder 26 comprises a radial bore 52 and a suction valve 53 so that the hydraulic fluid flows into the hollow cylinder via the bore 52 and the suction valve 53 during the suction phase.

During the compression and discharge phases, the suction valve prevents hydraulic fluid from escaping into the third casing 41 through the bore 52.

According to a third embodiment (FIG. 5), the cylinder 26 comprises a radial bore 54.

In this embodiment, the stroke of the hollow cylinder 26 in the bore associated with said hollow cylinder and the position of the radial bore 54 in the hollow cylinder 26 are selected so that the hydraulic fluid flows into the hollow cylinder 26 via the bore 54 during the suction phase, and such that the bore 46 is covered by the bore associated with said cylinder during the compression and discharge phases.

When implementing the second and third embodiments of the cylinder 26, the plates 18, 19 do not comprise supply lunules facilitating making of the plates 18, 19.

Furthermore, the third embodiment of the cylinder 26 allows simplifying making of said hollow cylinder 26 in comparison with the second embodiment of the hollow cylinder 26 by removing the suction valve 53.

Referring again to FIG. 2, the turboprop 2 comprises, on the fixed portion 9, control means 55 connected to the motor 38.

The control means 55 control the motor 38 based on the angle measurement made by the sensor 6 and on a setpoint CONS received, for example, from a controller of the aircraft 1, and are made, for example, from a processing unit configured to control the motor 38 according to the angle value detected by the sensor 6 and the setpoint CONS.

The sensor 6 communicates with the control means 55 for example via a wireless link.

The control means 55 control the direction of rotation and the rotational speed of the motor 38 so that the angle of the propeller pitch measured by the sensor 6 is equal to the angle setpoint CONS.

According to the direction of rotation of the motor 38, the transmission shaft 28 drives the first 20 or second 21 barrel generating a pressurised fluid supplying the first 16 or second 17 chamber of the cylinder 11.

The cylinder 11 actuates the device 5.

If the motor 38 does not drive the transmission shaft 28 in rotation, none of the first and second barrels compresses hydraulic fluid so that the cylinder 11 is not supplied with fluid.

FIG. 6 illustrates an embodiment of the regulation means 13.

The regulation means 13 comprise a first inlet 56 connected to the first inlet 48 of the third casing 41, a second inlet 57 connected to the second inlet 49 of the third casing 41, and a third inlet 58 connected to the outlet 51 of the third casing 41.

The regulation means 13 further comprise a first outlet 59 connected to the first inlet 160 of the cylinder 11 and a second outlet 60 connected to the second inlet 170 of the cylinder 11.

The regulation means comprise two hydraulic distributors 61, 62 of the two-position and three-orifice "3/2" type, a check valve 63 and a hydraulic accumulator 64.

The first distributor 61 comprises an inlet 65 connected to the first inlet 56 of the regulation means 13, a first outlet 66 connected to the third inlet 58 of the regulation means 13, a second outlet 67 connected to the first outlet 59 of the regulation means 13, a control inlet 68 connected to the first inlet 65 of said distributor 61 and cooperating with a return spring 69 of said distributor 61 to control the position of the distributor.

In a first position of the first distributor 61, when the first barrel 20 is driven in rotation and supplies fluid to the inlet 65 of said distributor 61, the control inlet 68 supplied with fluid cooperates with the return spring 69 so that the inlet 65 supplies the second outlet 67 of the distributor 61 to supply the first chamber 16 of the cylinder 11, the first outlet 66 being blocked.

In a second position of the first distributor 61, when the first barrel 20 is not driven in rotation, no fluid circulates on the inlet 50 so that the control inlet 68 is not supplied with fluid. In this position, the inlet 65 is blocked and the first and second outlets 66, 67 are connected to one another.

The second distributor 70 comprises an inlet 71 connected to the second inlet 57 of the regulation means 13, a first outlet 72 connected to the third inlet 58 of the regulation means 13, a second outlet 73 connected to the second outlet 60 of the regulation means 13, a control inlet 74 connected to the first inlet 71 of said distributor 70 and cooperating with a return spring 75 of said distributor 70 to control the position of the distributor.

In a first position of the second distributor 70, when the second barrel 21 is not driven in rotation, no fluid circulates on the inlet 71 so that the control inlet 74 is not supplied with fluid. In this position, the inlet 71 is blocked and the first and second outlets 72, 73 are connected to one another.

In a second position, when the second barrel 21 is driven in rotation and supplies fluid to the inlet 71 of said distributor 70, the control inlet 74 supplied with fluid cooperates with the return spring 75 so that the inlet 71 supplies the second outlet 73 of the distributor 70 to supply the second chamber 17 of the cylinder 11, the first outlet 72 being blocked.

The regulation means 13 allow supplying either one of the chambers 16, 17 of the cylinder 11 depending on the barrel 20, 21 driven in rotation.

The hydraulic fluid contained in the chamber of the cylinder 11 that is not supplied is discharged through the inlet 51 into the third casing 41.

The regulation means 13 are controlled by the pressure of the hydraulic fluid output by the pump 12 so that it is not necessary to implement, in the rotating portion (propulsion shaft 7), control members that need to be connected to control members arranged in the fixed portion of the turboprop such as a calculator.

Like the cylinder 11, the third casing 41 of the pump 12 and the regulation means 13 of the hydraulic system 4 forming a closed circuit rotate at the rotational speed of the propeller 3, the system does not require the implementation of a hydraulic rotary joint.

Moreover, the closed circuit is independent of a lubrication circuit of the turboprop so that it operates independently of the other hydraulic members of the aircraft thereby minimising the risks of failures of said system upon failure of the other hydraulic members of the aircraft.

Furthermore, since the pump 12 is driven in rotation by the electric motor 38 located on the fixed portion of the turboprop, the system does not require an electrical rotary joint.

In addition, since the rotational speed of the third casing is decorrelated from the rotational speed of the transmission shaft 28, the electric motor 38 rotates at a rotational speed lower than that of the propeller 3 so that it consumes less electrical energy improving the energy efficiency of the system 4.

The clutch means 29, 30 drive only one of the barrels according to the direction of rotation of the transmission shaft 28 so that the other barrel is not driven thereby preventing it from being subjected to cavitation phenomena.

In addition, the clutch means 29, 30 made from flywheels are simple to make.

The accumulator 64 is connected to one end of the valve 63, the other end of the valve being connected to the third inlet 58 of the regulation means 13.

The accumulator 64 is sized so as to form a low-pressure reference for the closed hydraulic circuit.

The accumulator 64 cooperates with the valve 63 so as to compensate for the leaks in the closed circuit and absorb the temperature variations in the closed circuit.

The invention claimed is:

1. A reversible hydraulic pump for setting pitch of a propeller of a turboprop comprising two barrels connected by a transmission shaft, wherein the two barrels are connected to the transmission shaft via first and second clutch means so that, when the transmission shaft rotates in a first direction, only a first barrel of the two barrels is driven in rotation by the transmission shaft, and so that, when the transmission shaft rotates in a second direction opposite to the first direction, only a second barrel of the two barrels is driven in rotation by the transmission shaft, wherein each barrel of the two barrels comprises a different bore of a set of bores and a different hollow cylinder of a set of hollow cylinders sliding in the bore when said each barrel is rotating, each hollow cylinder including a radial bore and a suction valve so that a hydraulic fluid flows into at least one hollow cylinder via the bore and the suction valve during a phase for sucking the fluid into said each barrel by the hollow cylinder.

2. The pump according to claim 1, wherein:

the first clutch means comprises a first flywheel connecting a first barrel of the two barrels to the transmission shaft when the transmission shaft rotates in the first direction and uncouples the first barrel from the transmission shaft when the transmission shaft rotates in the second direction; and the second clutch means comprises a second flywheel connecting a second barrel of the two barrels to the transmission shaft when the transmission shaft rotates in the second direction and uncouples the second barrel from the transmission shaft when the transmission shaft rotates in the first direction.

3. The pump according to claim 1, further comprising two symmetrical and opposite angled plates, and two casings, a first casing of the two casings accommodating a first plate of the two symmetrical and opposite angled plates and a first cylinder, and a second casing of the two casings accommodating a second plate of the two symmetrical and opposite angled plates and a second cylinder, the first and second plates of the two symmetrical and opposite angled plates and the first and second casings of the two casings being fixed with respect to the transmission shaft, central axes of the plates and of the two barrels being coaxial.

4. The hydraulic pump according to claim 3, wherein the second casing further comprises an electric motor for driving the transmission shaft, the motor including a rotor formed on the transmission shaft and a stator secured to the second casing.

5. The pump according to claim 1, further comprising sliding pads, hollow cylinders of the first barrel bearing on a first plate via sliding pads, and hollow cylinders of the second barrel bearing on a second plate via the sliding pads, the pump further comprising a third cylindrical card accommodating first and second casings, and intended to contain the hydraulic fluid sucked in during the suction phase, a central axis of a third casing and a central axis of each plate being coaxial, the third casing rotating around the first and second casings and including two port plates each located at the end of a different barrel opposite to the end of said barrel opposite a plate, each cylindrical port plate comprising a concentric groove connected to an outlet different from the casing, each end of the hollow cylinder opposite to the end of said hollow cylinder in contact with a sliding pad comprising a discharge valve so that, during the discharge phase, pressurised hydraulic fluid compressed by the hollow cylinders of one of the first and second barrels escapes from the casing via one of outlets of the casing connected to said barrel, the third casing further comprising an inlet intended to supply the casing with hydraulic fluid.

6. A hydraulic system for setting the pitch of a propeller of a turboprop, the hydraulic system comprising the reversible hydraulic pump according to claim 5, a double-acting hydraulic cylinder including two inlets each connected to a different chamber of the double-acting hydraulic cylinder and configured to drive a propeller pitch setting mechanical device, each inlet of the double-acting hydraulic cylinder being connected to a different outlet of the third casing via regulation means, and the inlet of the third casing being connected to the inlets of the double-acting hydraulic cylinder via the regulation means, the regulation means being configured to connect a first outlet of the third casing to a first inlet of the double-acting hydraulic cylinder and to connect the second inlet of the double-acting hydraulic cylinder to the inlet of the third casing when pressurised hydraulic fluid flows through the first outlet, and being configured to connect the second outlet of the third casing to the second inlet of the double-acting hydraulic cylinder and to connect the first inlet of the double-acting hydraulic cylinder to the inlet of the third casing when pressurised hydraulic fluid flows through the second outlet.

7. A turboprop comprising a propulsion propeller connected to a propeller pitch setting mechanical device and a hydraulic system according to claim 6, the double-acting hydraulic cylinder of the hydraulic system being connected to the propeller pitch setting mechanical device.

8. The turboprop according to claim 7, further comprising control means configured to control an electric motor according to a setpoint value and the pitch angle of the propeller.

9. An aircraft including the turboprop according to claim 7.

10. A reversible hydraulic pump for setting pitch of a propeller of a turboprop comprising two barrels connected by a transmission shaft, wherein the two barrels are connected to the transmission shaft via first and second clutch means so that, when the transmission shaft rotates in a first direction, only a first barrel of the two barrels is driven in rotation by the transmission shaft, and so that, when the transmission shaft rotates in a second direction opposite to the first direction, only a second barrel of the two barrels is driven in rotation by the transmission shaft, wherein each barrel of the two barrels comprises a different bore of a set of bores and a different hollow cylinder of a set of hollow cylinders sliding in the bore when said each barrel is rotating, each hollow cylinder including a radial bore, a stroke of the hollow cylinder in the bore associated with the hollow cylinder and a position of the radial bore in the hollow cylinder being selected so that a hydraulic fluid flows into at least one hollow cylinder via the bore during a phase of sucking the fluid into said each barrel by the hollow cylinder, and so that the bore of said cylinder is covered by the bore associated with said each hollow cylinder during a phase of compressing the fluid in said each barrel and a phase of discharging the fluid out of said each barrel by the hollow cylinder.

11. The pump according to claim 10, wherein:

the first clutch means comprises a first flywheel connecting a first barrel of the two barrels to the transmission shaft when the transmission shaft rotates in the first direction and uncouples the first barrel from the transmission shaft when the transmission shaft rotates in the second direction; and the second clutch means comprises a second flywheel connecting a second barrel of the two barrels to the transmission shaft when the transmission shaft rotates in the second direction and uncouples the second barrel from the transmission shaft when the transmission shaft rotates in the first direction.

12. The pump according to claim 10, further comprising two symmetrical and opposite angled plates, and two casings, a first casing of the two casings accommodating a first plate of the two symmetrical and opposite angled plates and a first cylinder, and a second casing of the two casings accommodating a second plate of the two symmetrical and opposite angled plates and a second cylinder, the first and second plates of the two symmetrical and opposite angled plates and the first and second casings of the two casings being fixed with respect to the transmission shaft, central axes of the plates and of the two barrels being coaxial.

13. The hydraulic pump according to claim 12, wherein the second casing further comprises an electric motor for driving the transmission shaft, the motor including a rotor formed on the transmission shaft and a stator secured to the second casing.

14. The pump according to claim 10, further comprising sliding pads, hollow cylinders of the first barrel bearing on a first plate via sliding pads, and hollow cylinders of the second barrel bearing on a second plate via the sliding pads, the pump further comprising a third cylindrical card accommodating first and second casings, and intended to contain the hydraulic fluid sucked in during the suction phase, a central axis of a third casing and a central axis of each plate being coaxial, the third casing rotating around the first and second casings and including two port plates each located at the end of a different barrel opposite to the end of said barrel opposite a plate, each cylindrical port plate comprising a concentric groove connected to an outlet different from the casing, each end of the hollow cylinder opposite to the end of said hollow cylinder in contact with a sliding pad comprising a discharge valve so that, during the discharge phase, pressurised hydraulic fluid compressed by the hollow cylinders of one of the first and second barrels escapes from the casing via one of outlets of the casing connected to said barrel, the third casing further comprising an inlet intended to supply the casing with hydraulic fluid.

15. A hydraulic system for setting the pitch of a propeller of a turboprop, the hydraulic system comprising the reversible hydraulic pump according to claim 14, a double-acting hydraulic cylinder including two inlets each connected to a different chamber of the double-acting hydraulic cylinder and configured to drive a propeller pitch setting mechanical device, each inlet of the double-acting hydraulic cylinder being connected to a different outlet of the third casing via regulation means, and the inlet of the third casing being connected to the inlets of the double-acting hydraulic cylinder via the regulation means, the regulation means being configured to connect a first outlet of the third casing to a first inlet of the double-acting hydraulic cylinder and to connect the second inlet of the double-acting hydraulic cylinder to the inlet of the third casing when pressurised hydraulic fluid flows through the first outlet, and being configured to connect the second outlet of the third casing to the second inlet of the double-acting hydraulic cylinder and to connect the first inlet of the double-acting hydraulic cylinder to the inlet of the third casing when pressurised hydraulic fluid flows through the second outlet.

16. A turboprop comprising a propulsion propeller connected to a propeller pitch setting mechanical device and a hydraulic system according to claim 15, the double-acting hydraulic cylinder of the hydraulic system being connected to the propeller pitch setting mechanical device.

17. The turboprop according to claim 16, further comprising control means configured to control an electric motor according to a setpoint value and the pitch angle of the propeller.

18. An aircraft including the turboprop according to claim 16.

* * * * *